(12) United States Patent
Annequin-Digond et al.

(10) Patent No.: US 12,545,218 B2
(45) Date of Patent: Feb. 10, 2026

(54) ROAD VEHICLE EQUIPPED WITH A BRAKING SYSTEM WITHOUT FRONT COMPARTMENT ENCUMBRANCE

(71) Applicant: FERRARI S.P.A., Modena (IT)

(72) Inventors: Thierry Annequin-Digond, Modena (IT); Alessandro Calamita, Modena (IT)

(73) Assignee: FERRARI S.P.A., Modena (IT)

( * ) Notice: Subject to any disclaimer, the term of this patent is extended or adjusted under 35 U.S.C. 154(b) by 445 days.

(21) Appl. No.: 18/176,067

(22) Filed: Feb. 28, 2023

(65) Prior Publication Data
US 2023/0278533 A1 Sep. 7, 2023

(30) Foreign Application Priority Data

Mar. 3, 2022 (IT) .................. 102022000003983

(51) Int. Cl.
*B60T 7/00* (2006.01)
*B60T 7/04* (2006.01)
*B60T 7/06* (2006.01)
*B62D 63/04* (2006.01)

(52) U.S. Cl.
CPC ................ *B60T 7/042* (2013.01); *B60T 7/06* (2013.01); *B62D 63/04* (2013.01); *B60T 2270/82* (2013.01)

(58) Field of Classification Search
CPC ... B60T 7/042; B60T 7/06; B60T 7/04; B60T 2270/82

USPC ..................................................... 296/193.01
See application file for complete search history.

(56) References Cited

U.S. PATENT DOCUMENTS

2010/0313698 A1 12/2010 Yoshida

FOREIGN PATENT DOCUMENTS

| KR | 970040440 A | 7/1997 |
|---|---|---|
| KR | 20050043373 A | 5/2005 |

OTHER PUBLICATIONS

Italian Search Report for Application No. 102022000003983; Filing Date—Mar. 3, 2022; Date of Mailing—Sep. 21, 2022, 7 pages.

*Primary Examiner* — Steven O Douglas
(74) *Attorney, Agent, or Firm* — CANTOR COLBURN LLP (57) ABSTRACT

A road vehicle comprising a vehicle body which defines along its length a longitudinal axis of the road vehicle and along its width a transversal axis of the road vehicle; a brake pedal, which is mounted on the vehicle so that it is hinged integral with the vehicle body; a braking unit also mounted integral with the vehicle body; the braking unit being mechanically connected, by means of a motion transmission system, to the brake pedal and configured to actuate the brakes of the road vehicle depending on the motion transmitted by the brake pedal; wherein the braking unit is arranged, in relation to the brake pedal, offset along the transversal axis of the road vehicle.

10 Claims, 6 Drawing Sheets

ROAD VEHICLE EQUIPPED WITH A BRAKING SYSTEM WITHOUT FRONT COMPARTMENT ENCUMBRANCE

CROSS-REFERENCE TO RELATED APPLICATIONS

This patent application claims priority from Italian Patent Application no. 102022000003983 filed on Mar. 3, 2022, the entire disclosure of which is incorporated herein by reference.

TECHNICAL FIELD

The present invention relates to a road vehicle comprising a braking system without front compartment encumbrance.

In particular, the present invention finds advantageous, but not exclusive, application in a braking system for high-performance vehicles, to which the following description will make explicit reference without thereby losing generality.

BACKGROUND OF THE INVENTION

As is known, different types of braking systems for road vehicles are available on the market.

Generally, the systems comprise a brake pedal and a braking unit that is mechanically connected to the brake pedal and configured to actuate the brakes at the wheels.

In particular, floor pedal braking systems are known, where the pedal is hinged to the bottom of the road vehicle and therefore, when braking, looking at the system sideways from the left of the vehicle, the pedal substantially rotates anticlockwise; suspended pedal braking systems are also known, where the pedal is hinged to an upper portion of the vehicle pedal compartment and therefore, when braking, looking at the system sideways from the left, the pedal substantially rotates clockwise.

Figure 1:
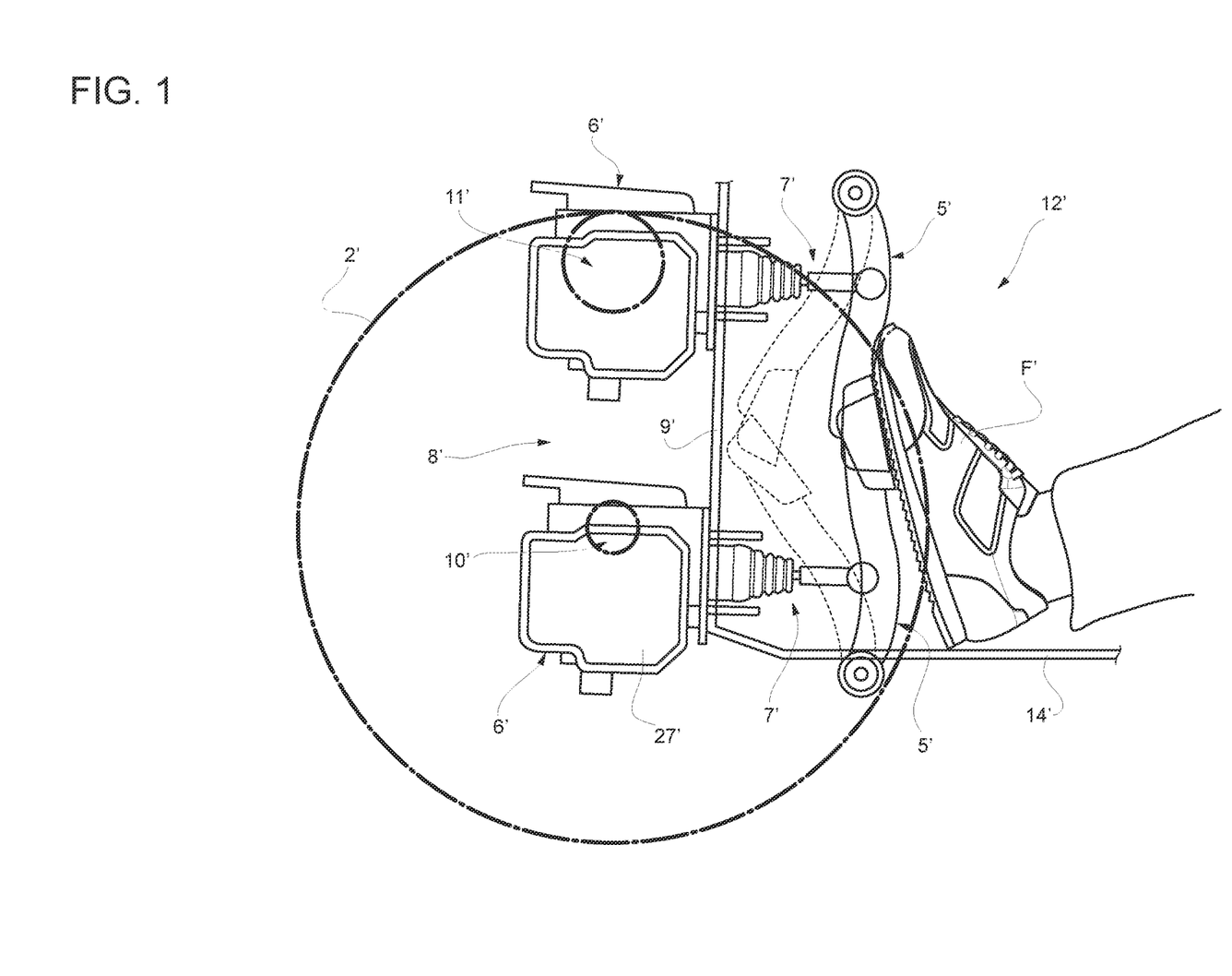
FIG. 1 is a schematic side view, with details removed for clarity, of a pedal compartment showing two possible solutions in accordance with the prior art.

Both configurations are characterised by the fact that the pedal is configured to push a rod provided with two ends, of which one is connected to the pedal by a joint and the other is connected to the braking unit to actuate the brakes (see FIG. 1).

Usually, regardless of whether it is in the floor or suspended configuration, the braking unit (also known as the power brake or brake assist unit) is arranged along the plane in which the brake pedal rotates, so as to directly move the rod between the pedal and the unit. In other words, the braking unit is arranged within the front compartment of the car (usually occupied by an engine and separated from the passenger compartment by a bulkhead), in particular in a position along the longitudinal axis of the vehicle passing through the brake pedal.

Especially in high-performance vehicles, it has been noted that, unless the wheelbase is excessively lengthened, the floor pedal configuration may interfere with the front axle shaft of the road vehicle.

In addition, it was noted that, in the case of shock absorbers external to the wheel well, e.g., horizontal ones, the suspended pedal configuration may interfere with the encumbrance of these shock absorbers.

Moreover, the presence of rigid elements, such as the braking units within the front compartment, increases the risk for the driver in the event of a front crash, reducing the deformable volume.

The object of the present invention is to provide a road vehicle comprising a braking system without front compartment encumbrance, which is at least partially free from the drawbacks described above and at the same time simple and inexpensive to manufacture.

SUMMARY

In accordance with the present invention, a road vehicle provided with a related braking system is provided as claimed in the following independent claims and, preferably, in any one of the claims directly or indirectly dependent on the independent claims.

The claims describe preferred embodiments of the present invention forming an integral part of the present specification.

BRIEF DESCRIPTION OF THE DRAWINGS

The present invention will now be described with reference to the accompanying drawings, which illustrate some non-limiting embodiments thereof, in which.

DETAILED DESCRIPTION

With reference to the accompanying figures, the reference numeral 1 indicates, as a whole, a road vehicle configured to be driven by a driver and provided with four wheels 2, two at the front (e.g., driving wheels) and two at the rear. The vehicle 1 is provided with a passenger compartment 3 which is adapted to at least accommodate the driver.

The same reference numbers and letters in the figures identify the same elements or components having the same function.

In the context of the present description the term "second" component does not imply the presence of a "first" component. These terms are in fact used as labels to improve clarity and should not be understood in a limiting way.

The elements and features disclosed in the various preferred embodiments, including the drawings, may be combined with one another without however departing from the scope of protection of the present application as described below.

The road vehicle 1 comprises a vehicle body 4, which in turn comprises at least a vehicle frame and a bodywork. The vehicle body 4 defines along its length a longitudinal axis LA of the road vehicle 1 and along its width a transversal axis TA of the road vehicle 1.

As shown in the non-limiting embodiments of FIGS. 2 to 6, the road vehicle 1 further comprises a brake pedal 5, which is configured to be pressed by the driver to actuate the brakes of the road vehicle 1. The brake pedal 5 is mounted on the vehicle 1 so that it is integrally hinged to the vehicle body 4. In other words, the pedal 5 is mounted so that it can move by rotating around a rotation axis AX.

Furthermore, the vehicle 1 comprises a braking unit 6 which is also mounted integral with the vehicle body 4. The braking unit is mechanically connected, via a motion transmission system 7, to the brake pedal 5 and is configured to actuate, depending on the motion transmitted by the brake pedal 5, the brakes of the road vehicle 1 (each arranged at a respective wheel 2).

Figure 3:
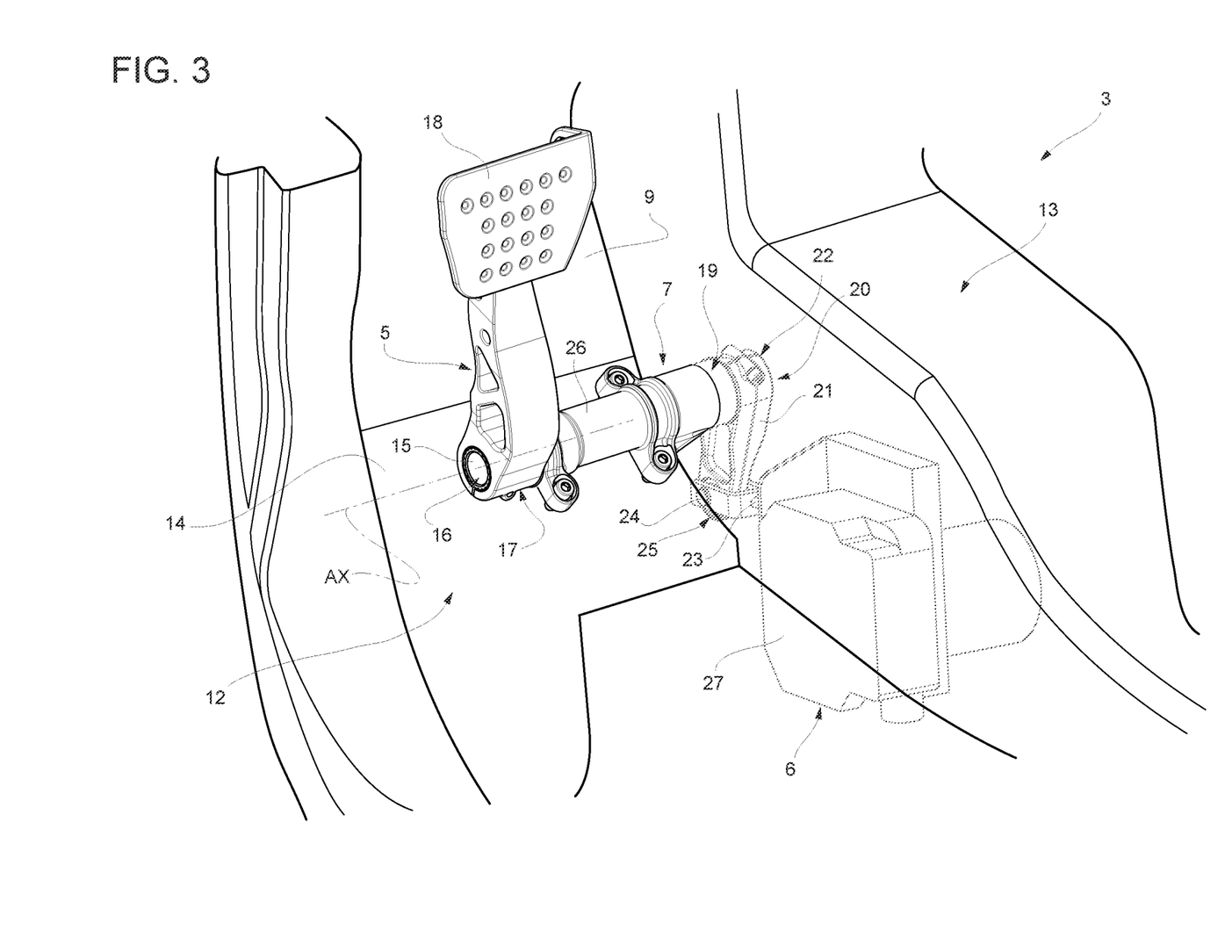
FIG. 3 is a schematic perspective view, with details removed for clarity, of the pedal compartment in FIG. 2.
Figure 6:
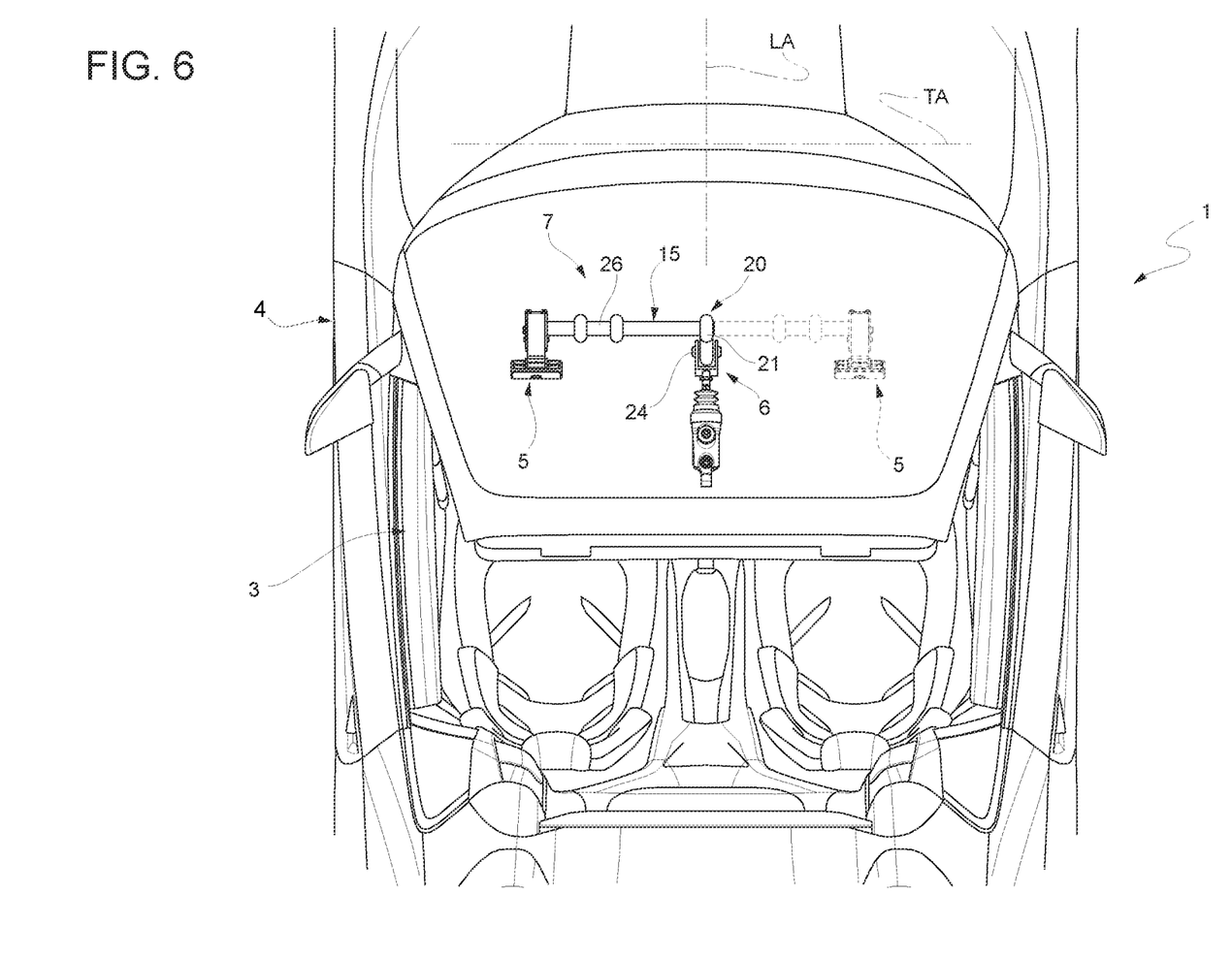
FIG. 6 is a plan schematic view, with details removed for clarity, of a possible embodiment of a road vehicle in accordance with the present invention.

Advantageously, but not limitingly, as shown in the non-limiting embodiments in FIGS. 3 and 6, the braking unit 6 is arranged, in relation to the brake pedal 5, offset along the transversal axis TA of the road vehicle 1. In other words, the braking unit 6 is located in a position that is not along the forward moving direction of the vehicle 1 in relation to the brake pedal 5.

In some preferred non-limiting cases, the vehicle 1 comprises a front compartment 8, which is configured to accommodate at least one engine (an electric, hybrid or internal combustion engine). In particular, the vehicle 1 further comprises a bulkhead 9 (FIG. 2), which separates the passenger compartment 3 and the front compartment 8 from each other.

Advantageously, but not necessarily, the braking unit 6 is arranged, in relation to the bulkhead 9, on the side opposite the front compartment 8. This way, referring to the non-limiting embodiment in FIG. 2, the braking unit 6 does not interfere with either a front axle shaft 10 (if the brake pedal 5 is a floor pedal) or with a shock absorber 11 not included in the wheel well. In contrast, FIG. 1 shows two different prior art solutions (in which the reference numbers are used, for the same objects, with the superscript '). In particular, the white colour depicts a braking system with a floor pedal 5', whereas the grey colour depicts a braking system with a suspended pedal 5'. It is immediately apparent that the floor system braking unit 6' interferes with the front axle shaft 10', whereas the suspended system braking unit 6' interferes with the shock absorber 10'.

The different arrangement of the braking unit 6 compared to the solutions in FIG. 1, i.e., on the opposite side of the bulkhead 9 relative to the front compartment 8, prevents complex operations, such as for example the perforation of the bulkhead, resulting in soundproofing, since the front compartment 8, if it accommodates an engine (whether it is an internal combustion or electric engine) produces a noise that is unpleasant if it enters the passenger compartment 3.

Preferably, the road vehicle 1 further comprises a pedal compartment 12, which at least partially houses the brake pedal 5 and is configured to accommodate, in use, at least one foot F of a driver. In particular, the braking unit 6 is arranged laterally offset, along the transversal axis TA of the road vehicle 1, in relation to the pedal compartment 12.

Advantageously, but not necessarily, the vehicle 1 further comprises a central tunnel 13 (shown in the non-limiting embodiments in FIGS. 3 and 6). In detail, the central tunnel 13 extends at least partially along the longitudinal axis LA of the road vehicle 1 (preferably centrally). Usually, the central tunnel 13 is configured to house wiring, piping, connections and electrical systems of any kind (also batteries, in the case of hybrid or electric vehicles).

In particular, the braking unit 6 is arranged within the central tunnel 13. In this way, it is possible to avoid soundproofing around the hole generated to connect the brake pedal 5 to the braking unit 6, as the inside of the central tunnel 14 is usually noiseless compared to the inside of the front compartment 8.

In some preferred non-limiting cases, the braking unit 6 is arranged at least not in front (at the rear) of the brake pedal 5 along the longitudinal axis LA of the vehicle 1 in the driving direction. In general, removing the encumbrance of the braking unit 6 from the portion in front of the brake pedal 5 (that is, behind the bulkhead) increases the safety of the vehicle 1 in the event of a front crash, as this creates an empty area (or in any case an area free of solid and rigid elements such as the braking unit 6) which allows the crash to be better absorbed.

Advantageously, but not necessarily, the braking unit 6 is arranged at least not higher than the brake pedal 5 along a vertical axis VA (i.e., vertically lower in relation to the ground). In this way, with particular reference to high-performance vehicles (for which it is a constant target), the centre of gravity of the vehicle 1 is further lowered compared to the configurations shown in FIG. 1.

Figure 2:
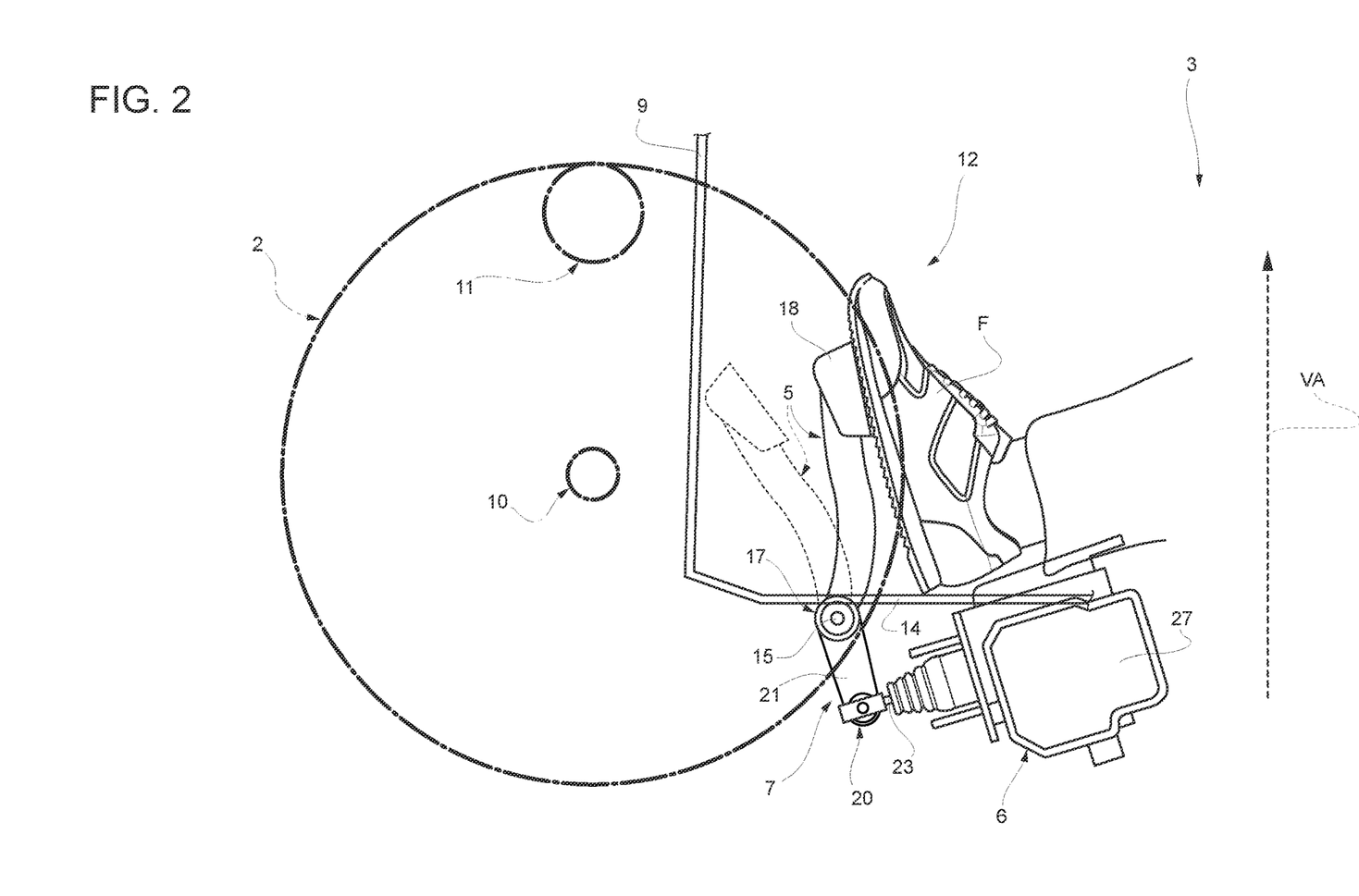
FIG. 2 is a schematic side view, with details removed for clarity, of a pedal compartment in which there is a braking system in accordance with the present invention.

In some non-limiting cases, such as those shown in FIGS. 2 and 3, the brake pedal 5 is hinged to a vehicular bottom 14, which delimits the pedal compartment 12 at the bottom. In this way, a floor pedal configuration is obtained, which is preferable in some high-performance vehicles for the above-mentioned barycentric reasons.

Figure 4:
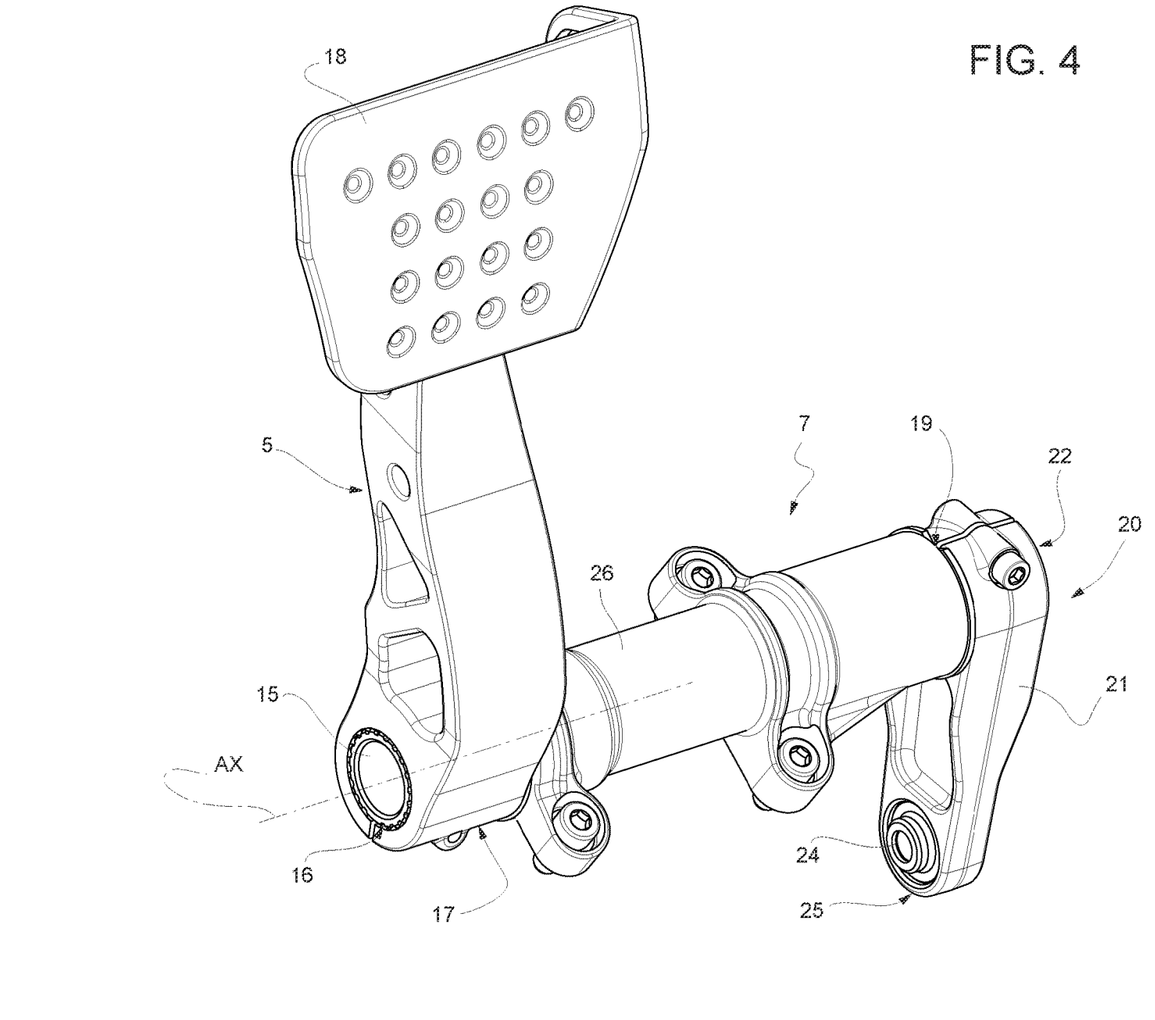
FIG. 4 is a front perspective view of a part of the braking system in FIGS. 2 and 3.
Figure 5:
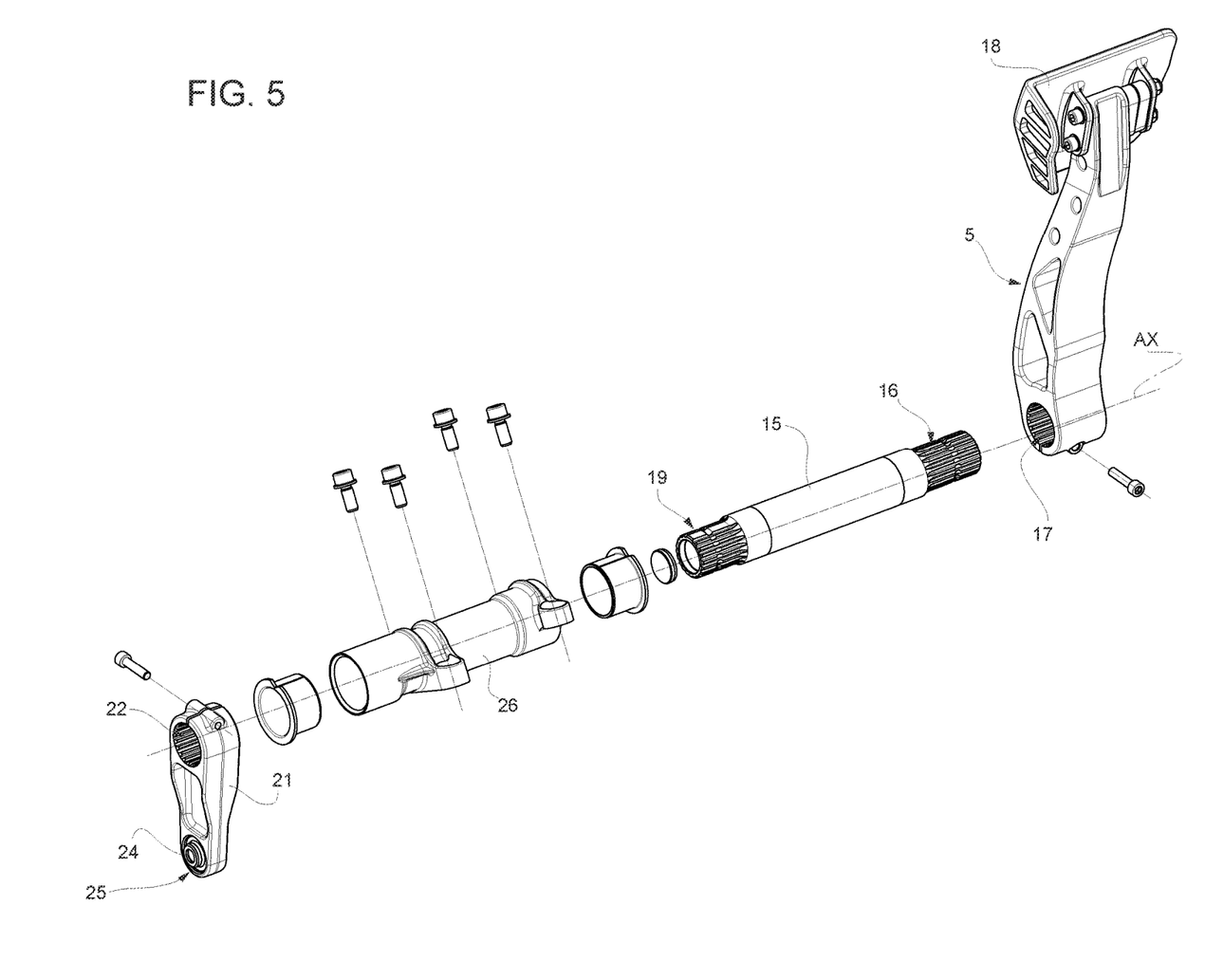
FIG. 5 is a rear exploded perspective view of the part in FIG. 4.

Advantageously, but not necessarily, and as shown in the non-limiting embodiments in FIGS. 4 and 5, the motion transmission system 7 comprises at least one splined shaft 15, of which a first portion 16 is connected by form-fit coupling to the brake pedal 5 (in particular, to one end 17 thereof opposite the pedal plate 18), and a second end 19 is connected by form-fit coupling to a linkage 20 transmitting the motion of the pedal to the braking unit 6, so as to actuate the brakes of the road vehicle 1.

Advantageously, but not necessarily, the splined shaft extends along the transversal axis TA of the road vehicle, particularly horizontally.

In particular, as shown in the non-limiting embodiments in FIGS. 4 and 5, the linkage 20 comprises at least one arm 21 (preferably acting as a connecting rod) which is provided with a third end 22 mechanically connected (by form-fit coupling) to the end 19 of the splined shaft 15.

In some preferred non-limiting cases, the motion transmission system 7, comprising both the linkage 20 and the splined shaft 15, is configured to give the driver exactly the same feedback on the brake pedal 5 he/she would have with a direct connection between the pedal 5 and the braking unit 6. To do this, the torsion of the shaft 15, as well as any elasticity/deformation of each component of the system 7 (e.g., the core of the brake pedal 5), shall preferably be taken into account.

In other non-limiting cases, not shown, for example, the movement of the arm 21 rotationally corresponds (for example with a 1:1 ratio or different, but in the reverse direction) to the movement of the brake pedal 5, thus at least partially changing the feedback on the brake pedal 5 for the driver.

According to the non-limiting embodiments in FIGS. 2 and 3, the linkage 20 further comprises a rod 23, also provided with two ends, one of which is coupled to the braking unit 6 and acts as an element directly actuating the braking unit 6, whereas the opposite end is connected, via a joint 24 (e.g., of the axial or spherical type, a bearing crossed by a pin, etc.), to a fourth end 25 of the arm 21 (opposite the third end 22).

Therefore, preferably, but without limitation, the linkage 20 is configured to transform the rotary motion of the pedal 5 (transmitted to the splined shaft 15 and the arm 21) into an axial movement of the rod 23 which actuates the braking unit 6 and thus the brakes of the road vehicle 1.

According to some preferred non-limiting embodiments, such as that shown in FIGS. 3, 4 and 5, the splined shaft 15 is movable in rotation within a tubular support element 26, which is mounted integral with the bottom 14 of the road vehicle 1.

Preferably, the braking unit 6 comprises a brake assist module 27 (in particular, an electrical, hydraulic or electrohydraulic brake assist module) of a known type and not further detailed below, which allows the driver to exert less pressure on the brake pedal 5 than that exerted then on the brakes of the road vehicle 1. In other words, the assist module 27 amplifies the signal received from the brake pedal 5. In particular, the braking unit 6 is of the brake-by-wire type.

In some preferred non-limiting cases, such as that shown in FIG. 6, the braking unit 6 is substantially arranged in the centre line (i.e., substantially in the middle of the width) of the vehicle 1, preferably along the longitudinal axis LA. In this way, it is possible to avoid changing the shape and position of the braking unit 6, which remains the same for both left-hand drive and right-hand drive vehicles.

In use, the driver presses the brake pedal 5, the motion of which is reflected on the motion transmission system 7, i.e., the splined shaft 15, the arm 21 and the rod 23, actuating the braking unit 6 which activates the brakes of the road vehicle 1.

Although the invention described above makes particular reference to a very precise embodiment, it is not to be construed as limited to this embodiment, since all the variants, modifications or simplifications covered by the attached claims, such as, for example, a different position of the braking unit, a different type of motion transmission system, a different type of vehicle, etc., fall within its scope.

The present invention has several advantages.

Firstly, moving the braking unit frees up space in the front compartment, which can be used for other components. In any case, passive safety is improved by eliminating the assist module in front of the driver's feet, reducing possible damage in the event of a front crash.

It is also no longer necessary to drill the holes in the bulkhead, which are used for the connection between the pedal and the assist module, and therefore the soundproofing of the passenger compartment is improved and facilitated, thereby increasing driving pleasure.

A further advantage of the present invention lies in reducing the variations between right-hand drive and left-hand drive versions of the same vehicle, allowing the braking unit to remain in the same position in both configurations.

Finally, by moving the braking unit lower and more centrally than in the prior art, the height of the centre of gravity of the road vehicle is also reduced.

LIST OF REFERENCE NUMBERS IN THE FIGURES 1 vehicle
2 wheels
3 passenger compartment
4 body
5 brake pedal
6 braking unit
7 motion transmission system
8 front compartment
9 bulkhead
10 front axle shaft
11 shock absorber
12 pedal compartment
13 central tunnel
14 vehicular bottom
15 splined shaft
16 first end
17 pedal end
18 pedal plate
19 second end
20 linkage
21 arm
22 third end
23 rod
24 joint
25 fourth end
26 support element
27 assist module
AX pedal rotation axis
F driver's foot
LA longitudinal axis
TA transversal axis
VA vertical axis

The invention claimed is:

1. A road vehicle (1) comprising:
 a vehicle body (4) which defines along its length a longitudinal axis (LA) of the road vehicle (1) and along its width a transversal axis (TA) of the road vehicle (1);
 a brake pedal (5), which is mounted on the vehicle (1) so that it is hinged to the vehicle body (4);
 a braking unit (6) mounted integral to the vehicle body (4); the braking unit (6) being mechanically connected, by means of a motion transmission system (7), to the brake pedal (5) and configured to actuate braking, depending on the motion transmitted by the brake pedal (5);
 a front compartment (8) configured to accommodate at least one engine, a passenger compartment (3) and a bulkhead (9), the bulkhead (9) separating the passenger compartment (3) and the front compartment (8) from each other; and
 a central tunnel (13), which extends at least partially along the longitudinal axis (LA) of the road vehicle (1);
 wherein the braking unit (6) is arranged within the central tunnel (13), and wherein the braking unit (6) is arranged, in relation to the brake pedal (5), offset along the transversal axis (TA) of the road vehicle (1); wherein the braking unit (6) is arranged, in relation to the bulkhead (9), on the side opposite the front compartment (8).

2. The vehicle (1) according to claim 1, wherein the braking unit (6) is arranged laterally offset, along the transversal axis (TA) of the road vehicle (1), in relation to a pedals compartment (12), configured to accommodate, in use, at least one foot of a driver.

3. The vehicle (1) according to claim 1, wherein the braking unit (6) is arranged at least not in front of the brake pedal (5) along the longitudinal axis (LA) of the vehicle (1) in the driving direction.

4. The vehicle (1) according to claim 1, wherein the braking unit (6) is arranged at least not higher than the brake pedal (5) along a vertical axis (VA).

5. The vehicle (1) according to claim 1, wherein the brake pedal (5) is hinged to a vehicular bottom (14).

6. The vehicle (1) according to claim 1, wherein the motion transmission system (7) comprises at least one splined shaft (15), of which a first portion is connected by form-fit coupling to the brake pedal (5), and a second portion is connected by form-fit coupling to a linkage (20) transmitting the motion of the pedal (5) to the braking unit (6), so as to actuate the brakes.

7. The vehicle (1) according to claim 6, wherein the splined shaft (15) extends along the transversal axis (TA) of the road vehicle (1).

8. The vehicle (1) according to claim 6, wherein the splined shaft (15) is movable in rotation within a tubular support element (26), which is mounted integral with a bottom of the road vehicle (1).

9. The vehicle (1) according to claim 1, wherein the braking unit (6) comprises a brake assist module (27).

10. The vehicle (1) according to claim 1, wherein the braking unit (6) is of the brake-by-wire type.

\* \* \* \* \*